United States Patent [19]
Mintzberg et al.

[11] Patent Number: 5,765,061
[45] Date of Patent: Jun. 9, 1998

[54] ICON SUPERIMPOSING FILM MEMBER FOR USE WITH FILM CANISTER

[75] Inventors: Marc P. Mintzberg, 3524, avenue du Musée, Montreal, Quebec, Canada, H3G 2C7; Donald M. Harvey, Webster, N.Y.

[73] Assignee: Marc P. Mintzberg, Montreal, Canada

[21] Appl. No.: 756,939

[22] Filed: Dec. 2, 1996

[51] Int. Cl.⁶ .................... G03B 17/24; G03B 17/26
[52] U.S. Cl. ........................... 396/316; 396/512
[58] Field of Search .................... 396/6, 310, 315, 396/316, 317, 318, 322, 340, 512, 767, 768, 769

[56] References Cited

U.S. PATENT DOCUMENTS

| | | | |
|---|---|---|---|
| 3,478,657 | 11/1969 | Michels | 396/316 |
| 3,916,423 | 10/1975 | Ueda et al. | 396/316 |
| 4,894,671 | 1/1990 | Wheeler et al. | 396/317 |
| 5,034,760 | 7/1991 | Khait | 396/316 |
| 5,038,161 | 8/1991 | Ki | 396/340 |
| 5,126,773 | 6/1992 | Ono et al. | 396/316 |
| 5,187,512 | 2/1993 | Kirkendall | 396/340 |
| 5,249,008 | 9/1993 | Mauchan | 396/316 |
| 5,546,146 | 8/1996 | Dobbs et al. | 396/322 |

*Primary Examiner*—A. A. Mathews
*Attorney, Agent, or Firm*—Oblon, Spivak, McClelland, Maier & Neustadt, P.C.

[57] ABSTRACT

A transparent film member (10) for superimposing an icon (13) on individual film frames (12') of an exposable film strip (12) as the frames are exposed in a camera (7) is described. The transparent film member (10) is detachably or permanently secured to a film canister (11) containing the exposable film strip (12) and secured in such a manner as to position the transparent film member between an aperture of an exposure chamber (21) of a camera and the film strip (12) whereby the icon (13) may be transferred onto individual frames (12') as they are exposed to produce a composite image comprised of a subject (24) being photographed and the icon (13).

20 Claims, 5 Drawing Sheets

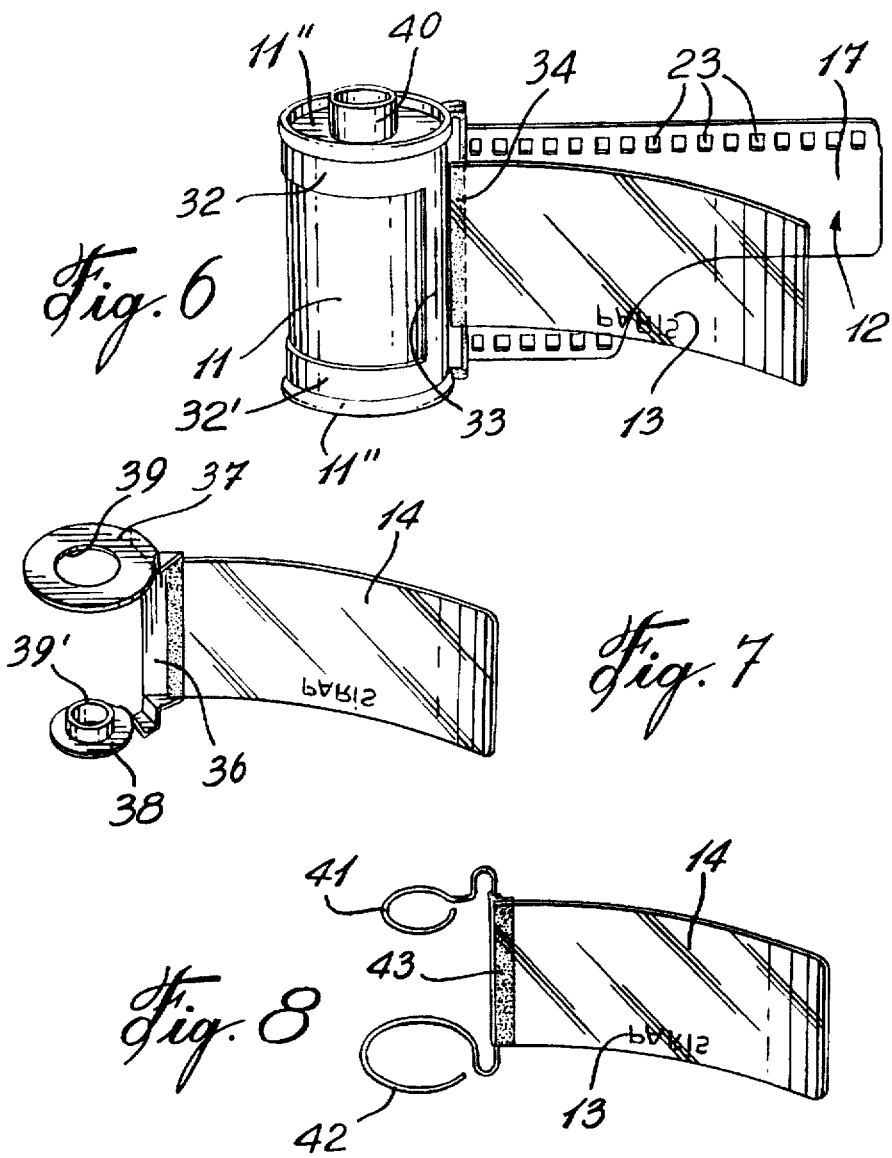
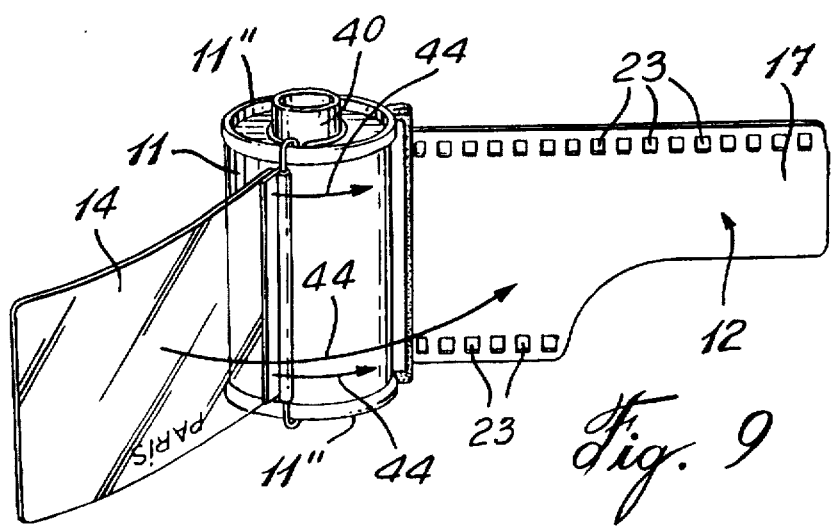

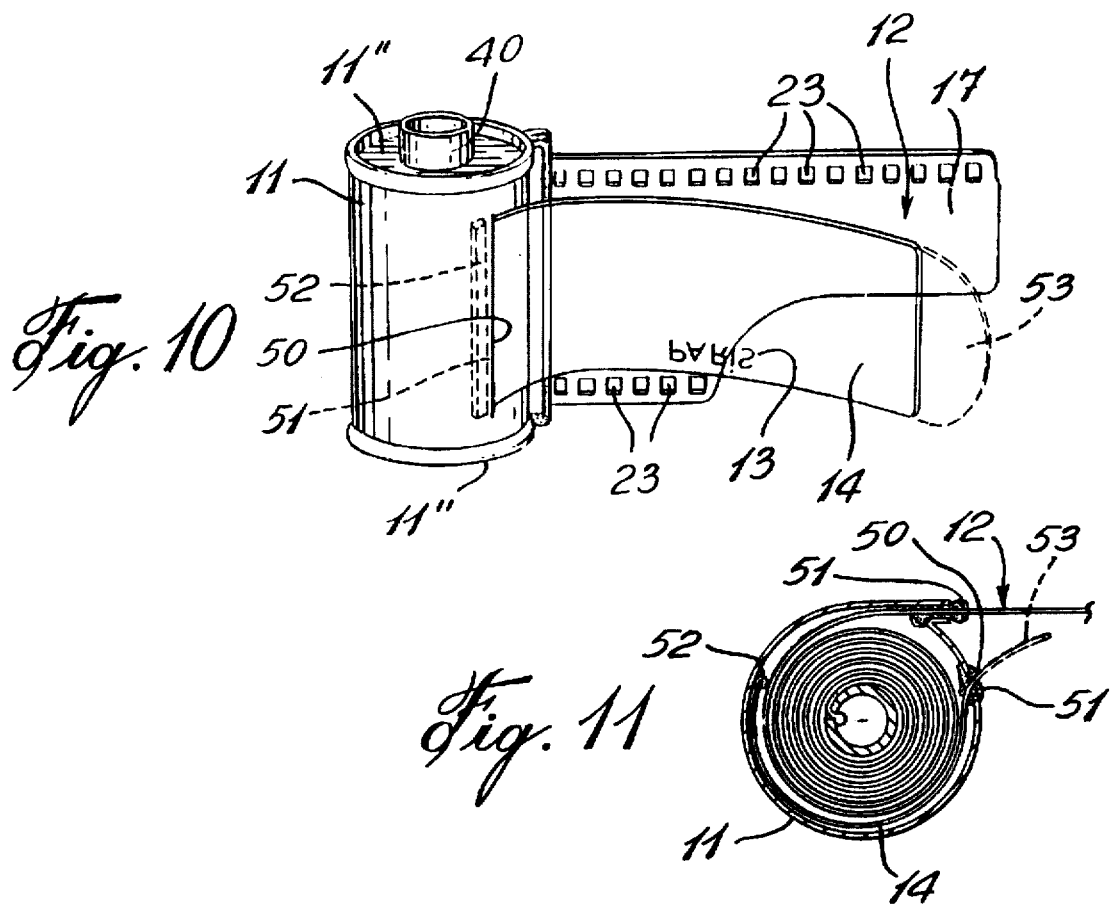
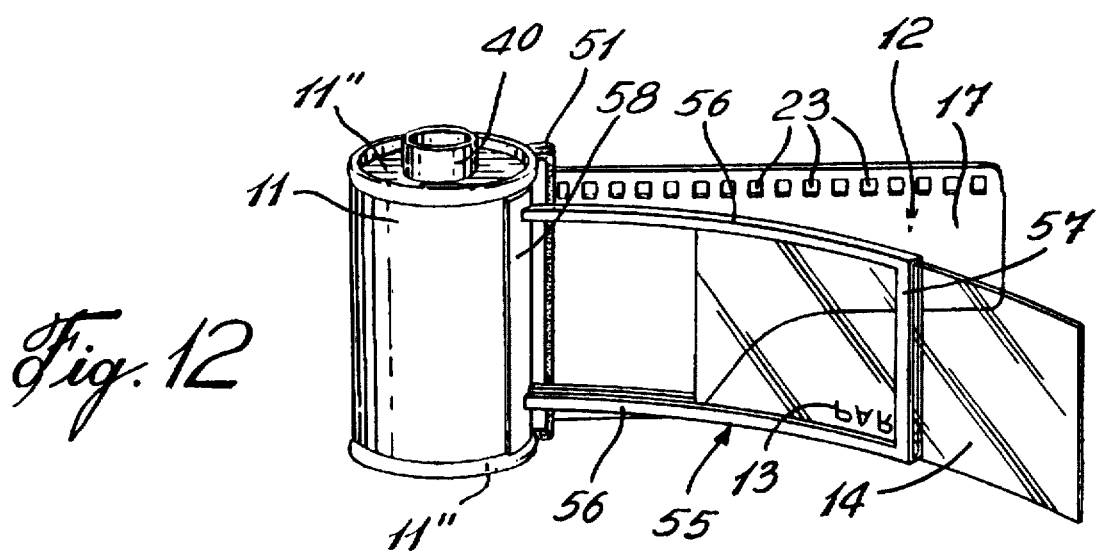

ICON SUPERIMPOSING FILM MEMBER FOR USE WITH FILM CANISTER

TECHNICAL FIELD

The present invention relates to a transparent film member for superimposing an icon on individual film frames of an exposable roll film strip contained within a film canister and exposed in a camera and wherein the said film member is securable to the film canister.

BACKGROUND ART

Reference is made to my co-pending applications Ser. No. 08/674,527 entitled "A Disposable Camera With Composite Image Forming Means" and my application Ser. No. 08/664,433 entitled "Camera With Composite Image Modifying Means", both of which disclose a camera which incorporates therein a transparent carrier member that is positioned between the exposure chamber or light well of a camera and an exposable film strip displaceable thereagainst whereby to expose an icon such as words, designs, images, etc., on the film frames as they are exposed so as to produce a composite image consisting of the icon and the subject being photographed.

I have additionally discoved that there is a further need to provide a transparent film member on which an icon is printed, exposed, or otherwise produced and which could be attached to the film canister by the user or else provided pre-attached to a film canister so that upon inserting of the film canister within the camera, the film strip carrying the icon is positionable between the exposure chamber of the camera and the exposable film strip which is displaceable thereover.

SUMMARY OF INVENTION

It is therefore a feature of the present invention to provide a transparent film member which fulfills the above defined need.

Another feature of the present invention is to provide a transparent film member carrying an icon and provided with attachment means to secure same to a film canister containing an exposable roll film strip therein.

Another feature of the present invention is to provide the above-mentioned icon carrying transparent film member in combination with a film canister having an exposable roll film strip wound therein and displaceable against the icon carrying film member when used in a camera.

According to the above features, from broad aspect, to the present invention provides a transparent film member for superimposing an icon on individual film frames of an exposable film strip as the frames are exposed in a camera. The transparent film member has attachment means for securing same to a film canister containing the exposable film strip whereby to position the transparent film member between an aperture of the camera and the film strip so that the icon may be transferred onto individual frames of the exposable film strip as they are exposed to produce a composite image comprised of a subject being photographed and the icon.

Another feature of the present invention is to provide such icon carrying transparent film member in combination with a film canister having an exposable film strip wound therein. The film member has a leader portion which extends out of the canister from a light shielded slot of the canister. When the canister is positioned within a camera, the film member is disposed between the exposure chamber of the camera and the exposable film strip and maintained in position due its securement to the canister.

BRIEF DESCRIPTION OF DRAWINGS

A preferred embodiment of the present invention will now be described with reference to the examples thereof as illustrated in the accompanying drawings in which:

FIG. 6 is a perspective view showing the transparent film member of the present invention secured to a film canister by another clamp-type attachment means;

FIG. 7 is a further perspective view showing the transparent film member of the present invention and having a still further clamp type attachment means for securing same to a film canister;

FIG. 8 is a plan view showing the transparent film member of the present invention but with a still further clamp-on type attachment means;

FIG. 9 is a perspective view showing the transparent film member and the clamp-on type attachment means of FIG. 8 and how it is secured to the film canister;

FIG. 10 is a perspective view showing a still further attachment means for securing the transparent film member to a film canister;

FIG. 11 is a simplified section view through the film canister of FIG. 10;

FIG. 12 is a perspective view of a still further embodiment of the attachment means and as herein shown the transparent film member is removably secured in a guide frame which is attached to the film canister;

DESCRIPTION OF PREFERRED EMBODIMENTS

Figure 1:
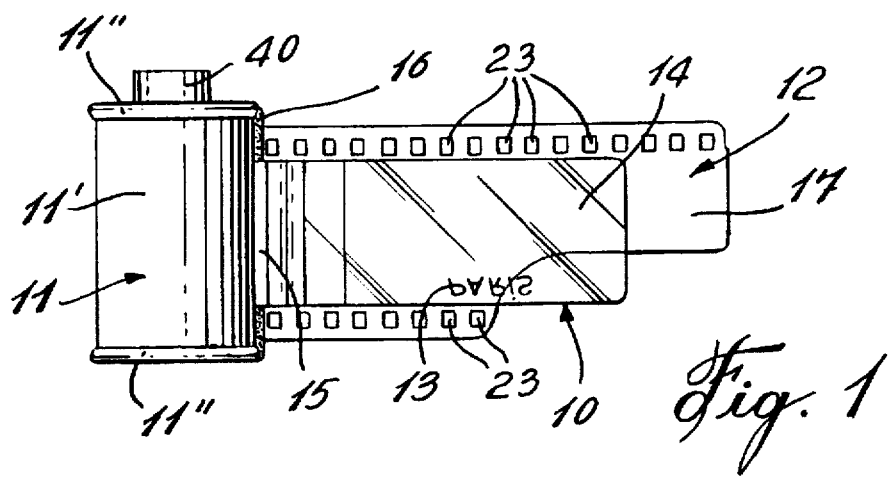
FIG. 1 is a simplified plan view showing an icon carrying transparent film member constructed in accordance with the present invention and attached to a film canister containing an exposable film strip therein.

Referring now to the drawings, and more particularly to FIGS. 1 to 3B, there is shown at 10 the transparent film member of the present invention which is secured to a film canister 11 in which there is wound an exposable film strip 12. The transparent film member 10 is provided with an icon 13 herein the name of the city of "Paris" exposed or otherwise printed thereon. Of course, this icon could be any printed matter or photographic material.

Figure 3A:
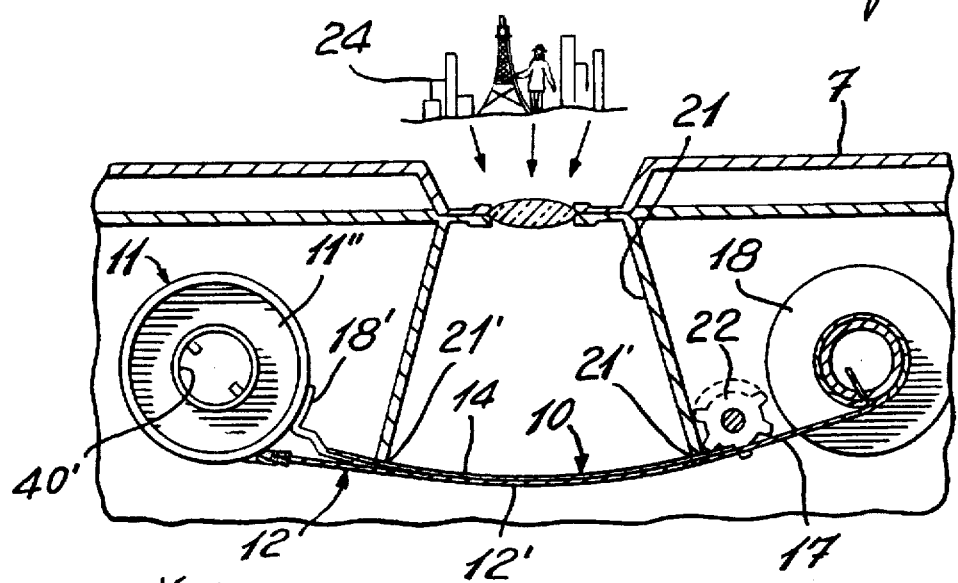
FIG. 3A is a simplified fragmented section view showing a portion of a camera in which the transparent film member is retained in position between the exposure chamber and the exposable film strip, by the canister in which the exposable film strip is wound.
Figure 3B:
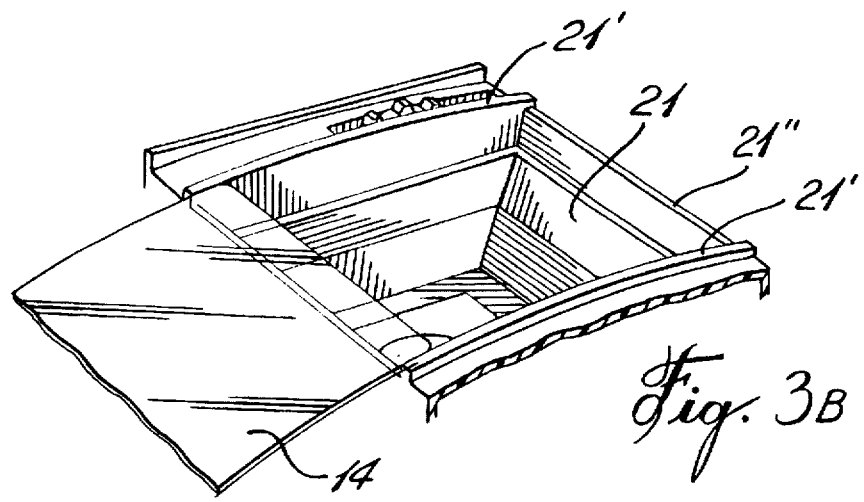
FIG. 3B is a perspective view showing the positioning of the icon carrying film member between rails of the exposure chamber aperture.

The transparent film member 10 is comprised of a rectangular screen 14 of clear transparent material having an attachment means, herein in the form of an attachment end piece 15, secured to the screen 14 along an end edge portion 15' thereof and attached to the canister 11 at a predetermined position adjacent the light shielded slot 16 of the canister 11 where the leader portion 17 of the exposable film strip 12 exits. The leader portion 17 is connected to the take-up spool 18 of the camera 7, as shown in FIG. 3. The attachment end piece 15 may be glued to the canister by an adhesive 15" on its curved position 18'. The attachment end piece 15 has a double bend to position the film member or screen 14 against the film strip 12. As also shown, the film screen 14 is curved slightly to fit snuggly over the aperture of the exposure chamber 21 of a camera light well, as shown in FIG. 3B. As can be seen these light wells usually have guide rails 21' to guide the film strip and this screen 14 fits between these rails 21' and may overlap the end rail 21". It is thin enough, while still rigid, to be positionned between the film strip 12 and end rail 21" without displacing the film from its proper film plane.

Figure 4:
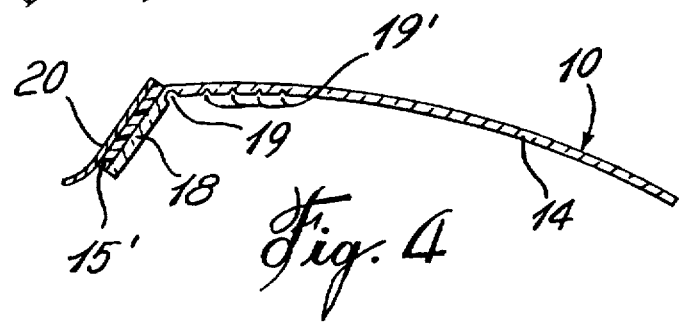
FIG. 4 is a section view showing the icon carrying transparent film member having an adhesive attachment tab secured to an attachment end for securement to a film canister.

FIG. 4 shows another construction of the transparent film member 10 of FIG. 1 and as herein shown the film member 10 is bent at a securing end portion 18 to facilitate the positioning of the curved rectangular screen 14 against the arcuate wall of the canister 11. The screen 14 lies against the exposable film 12 when secured within a camera, such as shown in FIG. 3A. The joint 19 between the securing end portion 18 and the rectangular screen 14 may contain a slit whereby to enhance the hingeability of the rectangular screen 14 with respect to the securing end for ease of positioning against the film strip 12.

Figure 2A:
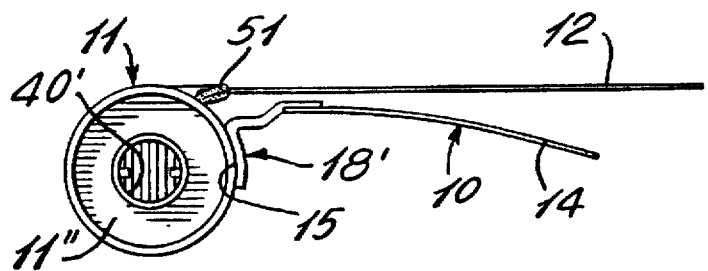
FIG. 2A is a top view of FIG. 1.

An adhesive strip 15' is provided with a protective peal-off silicone coated paper 20 which is easily peeled-off whereby to expose the adhesive 15' and to secure same at a proper position on the outer cylindrical wall 11' of the film canister 11, as shown in FIG. 2A. Further slits 19' may be provided in the region next to the securing end portion 18 to provide an accordion type joint to permit the positioning of the screen 14 to lie flat between the exposure chamber rails 21', see FIG. 3B, particularly if the attachment to the canister is not perfect When the film canister 11 is positioned within a camera, such as camera 7 as shown in FIG. 3A, the rectangular screen 14 is aligned with the exposure chamber 21 of the camera and maintained stationary thereacross by the guide rails 21' and its connection to the film canister. The leader portion of the film strip 17 is then wound about the spool 18 with the guide sprocket 22 in engagement with the sprocket holes 23 along the opposed edges of the exposable film strip 12. When the exposable film strip 12 is thus secured, an exposable frame 12' is created adjacent the exposure chamber 21. Accordingly, when a subject 24 is photographed it is exposed onto the exposure frame 12' together with the icon 13 which is transferred or superimposed thereon whereby to provide a composite image consisting of the subject 24 and the icon 13.

Figure 5A:
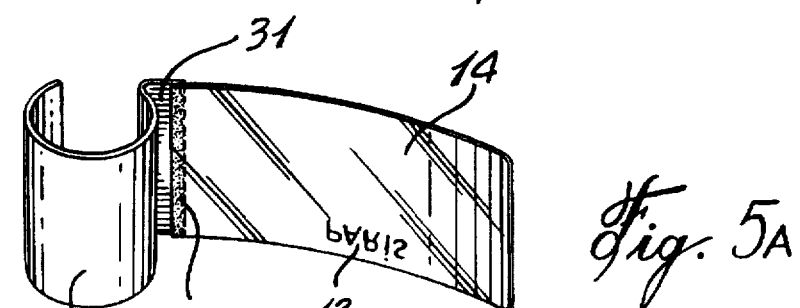
FIG. 5A is perspective view showing the transparent film member of the present invention but having a clamp-type attachment means secured thereto.
Figure 5B:
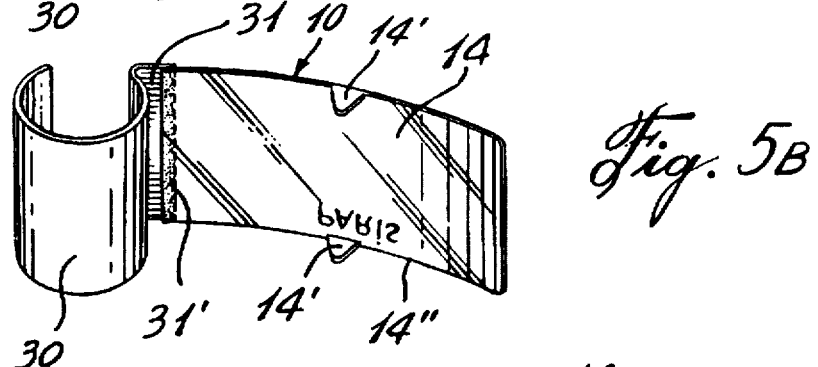
FIG. 5B illustrated friction tabs secured to the film member of FIG. 5A.

FIGS. 5A to 5B show a still further version of the attachment means and as herein shown it is constituted by a flexible molded clamp 30 formed of plastic material or other suitable material and having a segmented cylindrical cross-section whereby to snap-on to the film canister 11 between the opposed circular end walls 11" thereof as shown in FIG. 1. Again, the flexible clamp 30 would have a securement tab 31 to which the rectangular curved screen 14 is fused or otherwise secured. The screen 14 could also be detachably secured to the tab 31 by suitable attachment means, such as a glue strip 31'.

Figure 5C:
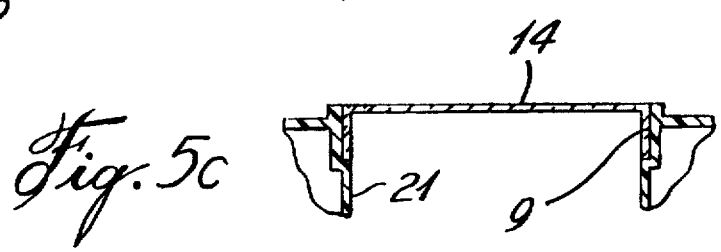
FIG. 5C is a section view showing the tabs of FIG. 5A in friction fit in the aperture of the light well.

As shown in FIG. 5B, the transparent film member 10 and particularly the screen member 14 thereof maybe provided with friction tabs, 14' provided in the opposed elongated edges 14" thereof for friction fit retention between opposed side walls 9 of the exposure chamber 21 or light well, as shown in FIG. 5C. This assures that the film member or screen 14 is retained in position over the aperture of the exposure chamber 21.

FIG. 6 shows a still further embodiment of the flexible clamp, and as herein shown the clamp is formed by opposed arcuate fingers 32 and 32' interconnected by a bridge wall 33 and also having a tab 34 to which the rectangular screen 14 is fused or otherwise detachably secured.

FIG. 7 shows a still further embodiment of the attachment means, as herein shown, is constituted by a flexible clamp which is comprised of an angulated edge attachment member 36 to which the screen 14 is connected and having opposed end adapters 37 and 38 secured transversely at opposed ends thereof. The end adapters 37 and 38 are adapted for clamp securement between the circular end walls 11" of the film canister 11 (see FIG. 1) and secured thereto by clamping pressure. The attachment bore 39 which clamps about the spool end 40 and the attachment projection 39' into the spool bore 40' of the canister 11, as shown in FIG. 3A, and this connection permits alignment of the screen 14 with respect to the film strip 12.

FIGS. 8 and 9 illustrate a still further embodiment of the attachment means. As herein shown the connectors are constituted by wire members 41 and 42 which are also securable to a respective one of the opposed ends walls 11" of the canister in a manner as shown in FIG. 9. These wire type connectors are secured to the end of a rigid screen attachment member 43 to which the rectangular screen 14 is fused or otherwise secured. As shown in FIG. 9 the wire connectors 41 and 42 are rotatably attached to the circular end walls 11" of the canister 11 and hingeable with respect thereto, see arrows 44, whereby to position the screen 14 in position against the exposable film strip 12 and the exposure chamber aperture 21'.

Figure 2B:
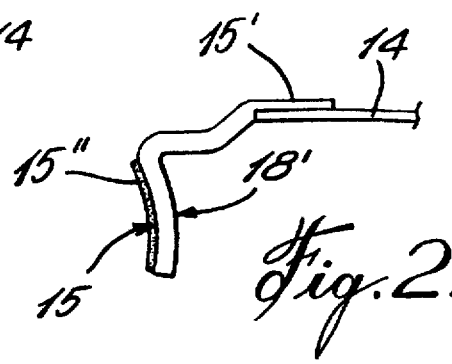
FIG. 2B is an enlarged view of the attachment end piece of the icon carrying film member.

With the embodiment as shown in FIG. 10, the attachment means is constituted by a retention slot 50 which is formed in the canister 11. The slot is also provided with light shielding means 51 which may be a felt or other suitable material as shown in FIG. 2, to prevent the ingress of light within the canister, as is well known in the art. The screen 14 is thus positioned wound inside the canister 11, as shown in FIG. 11, and has arresting means, herein in the form of a bead 52 provided at an inner end thereof to permit the screen 14 to be pulled out of the canister a predeterminable distance. A tab, as shown in phantom line at 53, may be formed at the free end of the screen 14 to protrude from the canister 11 whereby to provide a user person finger access to the screen 14. Preferably the tab 53 has a rounded end so that when the exposed film strip 12 is wound back into the canister 11 there is no obstruction therewith.

FIG. 12 shows a still further embodiment of the attachment means and as herein shown it is comprised of a rectangular frame 55 which is dimensioned to receive the rectangular screen 14 in sliding fit therein and across opposed guide channel arms 56. A reinforcing transverse member 57 maintains the channel arms 56 in parallel alignment together with the attaching frame member 58 at the opposed end which is also adhesively secured to the canister 11. With this particular embodiment, the guide frame 55 may be used with different canisters and the adhesive would be selected to permit ease of application and removal. A different screen 14 with a different icon 13 could then be inserted for every film canister inserted within the user's camera. As also herein shown, the guide frame 55 is dimensioned to fit between the opposed rows of sprocket holes 23 provided in the film strip 12.

Figure 13:
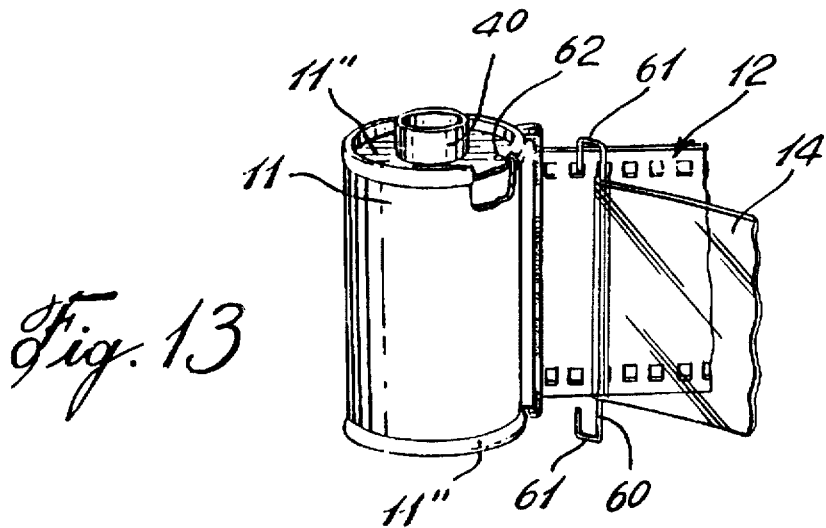
FIG. 13 is a perspective view, partly fragmented, showing a still further example of the attachment means.

FIG. 13 shows a still further embodiment of the attachment means to secure the transparent film member 10 of the present invention to the film canister 11. As herein shown the attachment means is constituted by a strait wire rod member 60 having opposed u-shape hooks 61 which are receiving clamping retention within opposed holes 62 conveniently located in the end walls 11" of the film canister 11 and in a manner as not to permit light to enter the film canister. The hook member 61 when secured within the holes 62 is free to pivot therein whereby to provide a hinged connection of the transparent film member 10 to the canister. The dimension and shape of the wire rod member 60 and its hooks 61 are such as to permit the dissect form of attachment to pivot whereby to position the transparent film member 10 against the camera exposure chamber aperture, as previously described and with the film strip 12 displaceable thereover.

Figure 14:
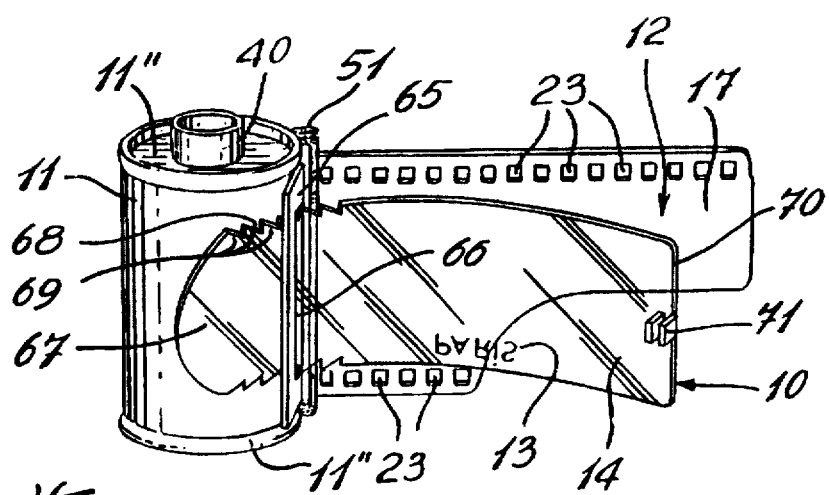
FIG. 14 is a perspective view illustrating yet another example of the attachment means.

FIG. 14 shows a still further example of an attachment means whereby to secure the transparent film member 10 and its screen 14 to the film canister 11. As herein shown the attachment means is constituted by a flexible flange 65 secured to the canister adjacent the light shielded slot means 51 and having a slot 66 formed within the flexible flange 65 whereby to receive and retain a connecting end 67 of the transparent film member 10. The opposed end or free end 70 of the transparent film member 10 or screen 14 is provided with a transverse hook member 71 secured thereto. The connecting end 67 is provided with opposed serrated edges 68 having therein formed a plurality of teeth formation 69 and dimensioned for engagement between the opposed ends of the slot 66 as the transparent film member 10 is pulled therethrough when the film canister 11 is rotated in the direction of arrow 75 when attaching the exposable film strip 17 to a take-up spool (not shown).

Figure 15:
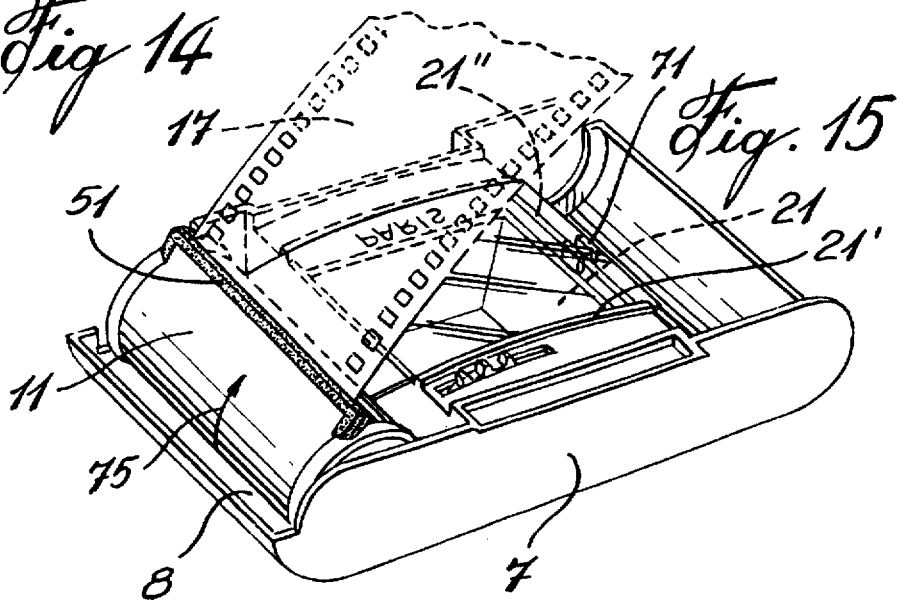
FIG. 15 is a perspective view of a camera loaded with a film canister having the embodiment of FIG. 15 secured thereof.

As shown in FIG. 15, in order to secure the transparent film member 10 over the aperture of the exposure chamber 21 and between the guide rails 21' thereof, the transverse hook member 71 is attached to the end wall 21", as shown in FIG. 3B and the canister 11 is disposed in the canister receiving cavity 8 of the camera 7. The film strip leader portion 17 extends upwardly as herein shown to provide access to the exposure chamber 21 to position the transparent film strip 10 thereover. The flexible flange 65 is located under the light shielded opening 51 of the film strip 17 and as the film strip 70 is brought down to be wound about the take-up spool, such as a spool 18, as shown in FIG. 3A, the canister 11 will pivot in the direction of arrow 75 causing the connecting end 67 of the film member 10 to advance through the slot 66 of the flexible flange 65 to maintain the film strip taut over the aperture of the exposure chamber and between the guide rails 21'.

It is pointed out that the icon printed or exposed on the screen may have different densities whereby the subject being photographed can appear through the icon on the composite photograph. Additionally, the screen may have a light color whereby to produce photographs having a different color tone mixed with the colors of the subject. The icon can also be of a different color to suit a theme. etc . .

It is further pointed out that the icon carrying film member of the present invention is not restricted for use with "single-use" type cameras but is adaptable to other type cameras which utilize film canisters.

It is within the ambit of the present invention to cover any obvious modifications of the examples of the preferred embodiment described herein, provided such modifications fall within the scope of the appended claims.

We claim:

1. A transparent film member for superimposing an icon on individual film frames of an exposable film strip as said frames are exposed in a camera, said transparent film member having attachment means adapted for securing same to a film canister containing said exposable film strip to position said transparent film member between an aperture of an exposure chamber of said camera and said film strip whereby said icon will be transferred onto individual frames as they are exposed in said camera to produce a composite image comprised of a subject being photographed and said icon, said film member being a rectangular screen of transparent film material dimensioned to overlie the exposable frame of said film strip and extending between opposed rows of sprocket holes of said film strip, said screen having sufficient rigidity to retain its shape while said film strip is displaced thereagainst in a camera, said attachment means being a flexible clamp secured to said screen and adapted to be detachably secured to a film canister at a predetermined location.

2. A transparent film member as claimed in claim 1 in combination with a film canister having an exposable film strip wound therein, said film strip having a leader position extending out of said canister from a light shielded slot of said canister.

3. A transparent film member as claimed in claim 2 wherein said canister is secured in a disposable type camera.

4. A transparent film member as claimed in claim 1 wherein said icon is printed matter.

5. A transparent film member as claimed in claim 1 wherein said icon is an image.

6. A transparent film member as claimed in claim 1 wherein said flexible clamp is an arcuate clamp which is detachably secured to a cylindrical side wall position of a film canister.

7. A transparent film member as claimed in claim 6 wherein said arcuate clamp has a straight edge securement tab to which said screen is secured to extend at an angle thereto, said straight edge tab being positioned substantially parallel adjacent a light shielded slot of a film canister and from which an exposable film strip extends.

8. A transparent film member as claimed in claim 1 wherein said flexible clip is comprised by an angulated edge attachment member having opposed connectors for attachment to opposed end walls of a film canister with said straight edge member positioned substantially parallel adjacent a light shielded slot of said film canister, said screen being secured to said edge member and overlying said exposable film strip.

9. A transparent film member as claimed in claim 8 wherein said opposed connectors are plastic molded adapters for attachment to said end walls of said canister.

10. A transparent film member as claimed in claim 8 wherein said opposed connectors are wire members formed to attach to said end walls of said canister.

11. The transparent film member as claimed in claim 1 further comprising a flexible joint adjacent said attachment means to facilitate positioning of said screen in alignment between an aperture of a camera and said exposable film strip.

12. A transparent film member as claimed in claim 1 wherein said screen is detachably secured to said attachment means.

13. A transparent film member as claimed in claim 1 wherein said rectangular screen is a curved screen formed of thin rigid transparent film material, said curved screen conforming substantially to curved guide rails of an opening of said exposure chamber.

14. A transparent film member as claimed in claim 1 wherein said screen is further provided with transverse friction tabs extending transversely from opposed side edges of said screen and in a common direction for frictional retention against opposed side walls of said exposure chamber adjacent an opening of said chamber over which said screen is disposed.

15. A transparent film member for superimposing an icon on individual film frames of an exposable film strip as said frames are exposed in a camera, said transparent film member having attachment means adapted for securing same to a film canister containing said exposable film strip to position said transparent film member between an aperture of an exposure chamber of said camera and said film strip whereby said icon will be transferred onto individual frames as they are exposed in said camera to produce a composite image comprised of a subject being photographed and said icon, said film member being a rectangular screen of transparent film material dimensioned to overlie the exposable frame of said film strip and extending between opposed rows of sprocket holes of said film strip, said screen having sufficient rigidity to retain its shape while said film strip is displaced thereagainst in a camera, said attachment means being comprised by a retention slot formed in said canister, said slot having light shielding means, said screen being positioned inside said canister and having a pull tab end protruding from said retention slot, and arresting means at an inner end of said screen to position said screen at a desired position against said exposable frame of said film strip and to constitute said attachment means.

16. A transparent film member for superimposing an icon on individual film frames of an exposable film strip as said frames are exposed in a camera, said transparent film member having attachment means adapted for securing same to a film canister containing said exposable film strip to position said transparent film member between an aperture of an exposure chamber of said camera and said film strip whereby said icon will be transferred onto individual frames as they are exposed in said camera to produce a composite image comprised of a subject being photographed and said icon, said film member being a rectangular screen of transparent film material dimensioned to overlie the exposable frame of said film strip and extending between opposed rows of sprocket holes of said film strip, said screen having sufficient rigidity to retain its shape while said film strip is displaced thereagainst in a camera, said attachment means being comprised by a rectangular frame dimensioned to receive said rectangular screen in sliding fit therein, said frame extending between said opposed rows of sprocket holes, said frame being secured to a film canister adjacent a light shielded slot thereof and through which an exposable film strip projects.

17. A transparent film member for superimposing an icon on individual film frames of an exposable film strip as said frames are exposed in a camera, said transparent film member having attachment means adapted for securing same to a film canister containing said exposable film strip to position said transparent film member between an aperture of an exposure chamber of said camera and said film strip whereby said icon will be transferred onto individual frames as they are exposed in said camera to produce a composite image comprised of a subject being photographed and said icon, said film member being a rectangular screen of transparent film material dimensioned to overlie the exposable frame of said film strip and extending between opposed rows of sprocket holes of said film strip, said screen having sufficient rigidity to retain its shape while said film strip is displaced thereagainst in a camera, said attachment means being a rectangular glue tab dimensioned for snug fit about a portion of a cylindrical wall of a film canister and adjacent a light shielded slot of said canister and through which an exposable film strip projects.

18. A transparent film member for superimposing an icon on individual film frames of an exposable film strip as said frames are exposed in a camera, said transparent film member having attachment means adapted for securing same to a film canister containing said exposable film strip to position said transparent film member between an aperture of an exposure chamber of said camera and said film strip whereby said icon will be transferred onto individual frames as they are exposed in said camera to produce a composite image comprised of a subject being photographed and said icon, said film member being a rectangular screen of transparent film material dimensioned to overlie the exposable frame of said film strip and extending between opposed rows of sprocket holes of said film strip, said screen having sufficient rigidity to retain its shape while said film strip is displaced thereagainst in a camera, said attachment means being a rigid attachment rectangular end piece formed with a double bend therein to position said rectangular screen against said film strip and over said exposure chamber of said camera.

19. A transparent film member for superimposing an icon on individual film frames of an exposable film strip as said frames are exposed in a camera, said transparent film member having attachment means adapted for securing same to a film canister containing said exposable film strip to position said transparent film member between an aperture of an exposure chamber of said camera and said film strip whereby said icon will be transferred onto individual frames as they are exposed in said camera to produce a composite image comprised of a subject being photographed and said icon, said film member being a rectangular screen of transparent film material dimensioned to overlie the exposable frame of said film strip and extending between opposed rows of sprocket holes of said film strip, said screen having sufficient rigidity to retain its shape while said film strip is displaced thereagainst in a camera, said attachment means being a wire rod member secured to an attachment end of said screen, said wire rod member having opposed hook members for detachable and hingeable connection within a hole provided in opposed end walls of said film canister.

20. A transparent film member for superimposing an icon on individual film frames of an exposable film strip as said frames are exposed in a camera, said transparent film member having attachment means adapted for securing same to a film canister containing said exposable film strip to position said transparent film member between an aperture of an exposure chamber of said camera and said film strip whereby said icon will be transferred onto individual frames as they are exposed in said camera to produce a composite image comprised of a subject being photographed and said icon, said film member being a rectangular screen of transparent film material dimensioned to overlie the exposable frame of said film strip and extending between opposed rows of sprocket holes of said film strip, said screen having sufficient rigidity to retain its shape while said film strip is displaced thereagainst in a camera, said attachment means being comprised by a flexible flange secured to said canister adjacent to a shielded opening through which said film strip projects, a connecting slot formed in said flexible flange, said screen having a connection end formed with opposed serrated edges for connection of said screen in said connection slot, and a hook member secured to an opposed free end edge of said screen for securement to an end edge of said exposure chamber with said screen extending over an exposure opening of said chamber.

* * * * *